United States Patent [19]
Ford et al.

[11] Patent Number: 5,664,015
[45] Date of Patent: *Sep. 2, 1997

[54] SHOWER SPEAKER TELEPHONE

[75] Inventors: Joseph E. Ford, Cary; Donald N. Jursich, Chicago, both of Ill.; Raymond Chan, Vancouver, Canada

[73] Assignee: Jing Mei Industrial Holdings, Inc., Cook Islands

[*] Notice: The term of this patent shall not extend beyond the expiration date of Pat. No. 5,625,688.

[21] Appl. No.: 544,770

[22] Filed: Oct. 18, 1995

Related U.S. Application Data

[63] Continuation-in-part of Ser. No. 490,786, Jun. 15, 1995, Pat. No. 5,625,688, and a continuation-in-part of Ser. No. 40,337, Jun. 15, 1995, Pat. No. Des. 369,357, and a continuation-in-part of Ser. No. 40,339, Jun. 15, 1995, Pat. No. Des. 372,474.

[51] Int. Cl.$^6$ ............................................. H04M 1/00
[52] U.S. Cl. ............... 379/433; 379/428; 379/420; 379/454; 379/455; 379/446
[58] Field of Search ............................. 379/433, 434, 379/428, 429, 420, 436, 100, 58–63, 446, 455, 454

[56] References Cited

U.S. PATENT DOCUMENTS

| | | | |
|---|---|---|---|
| D. 317,452 | 6/1991 | Garab | D14/250 |
| D. 321,885 | 11/1991 | Sheldrake | D14/253 |
| 2,453,192 | 11/1948 | Bryant | 179/179 |
| 2,538,419 | 1/1951 | Huston et al. | 179/156 |
| 3,962,555 | 6/1976 | Efaw | 179/185 |
| 4,071,040 | 1/1978 | Moriarty | 137/199 |
| 4,075,426 | 2/1978 | Gould | 379/100 |
| 4,920,564 | 4/1990 | Allkins | 379/437 |
| 5,025,921 | 6/1991 | Gasparaitis et al. | 206/320 |
| 5,095,503 | 3/1992 | Kowalski | 379/63 |
| 5,220,598 | 6/1993 | Bock | 379/110 |
| 5,297,203 | 3/1994 | Rose et al. | 379/62 |
| 5,329,650 | 7/1994 | Zaccai et al. | 4/605 |
| 5,416,839 | 5/1995 | Lee | 379/446 |

FOREIGN PATENT DOCUMENTS

| | | | |
|---|---|---|---|
| 6-268548 | 9/1994 | Japan | 379/428 |

*Primary Examiner*—Jack K. Chiang
*Attorney, Agent, or Firm*—Thomas W. Tolpin

[57] ABSTRACT

A safe cordless telephone with a hands-free speakerphone is provided for use in showers or when taking a bath. The user-friendly cordless telephone can be readily attached and removed from any portion of the shower/bath unit, such as: a shower wall, shower door, sliding shower panel, towel rack, bracket, holder, or shower head pipe. The shower speaker telephone can also have a radio, interom, clock, and a display window to display the telephone numbers of outgoing and/or incoming telephone calls. The dependable cordless telephone is made of an impact-resistant plastic capable of withstanding water pressure and is insulated to prevent electrical shock. A water-resistant antenna extends upwardly from the telephone housing. A battery seal is positioned about the battery chamber to prevent water from entering into the battery chamber. An elastomeric gasket is snugly positioned about the front and back of the handset to prevent water from entering into the interior of the handset and shorting the telephone circuitry. The base unit is located away from the shower and has a base antenna and a battery charger, as well as other features.

12 Claims, 2 Drawing Sheets

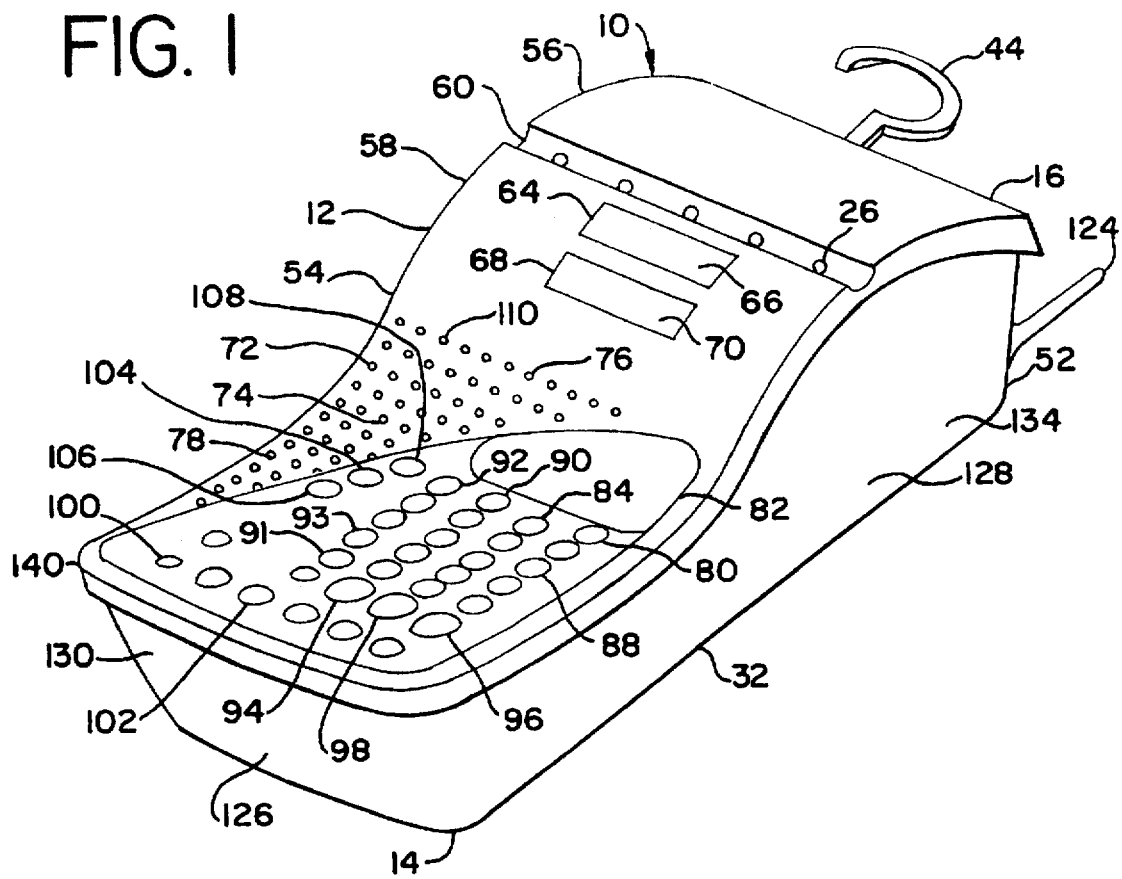
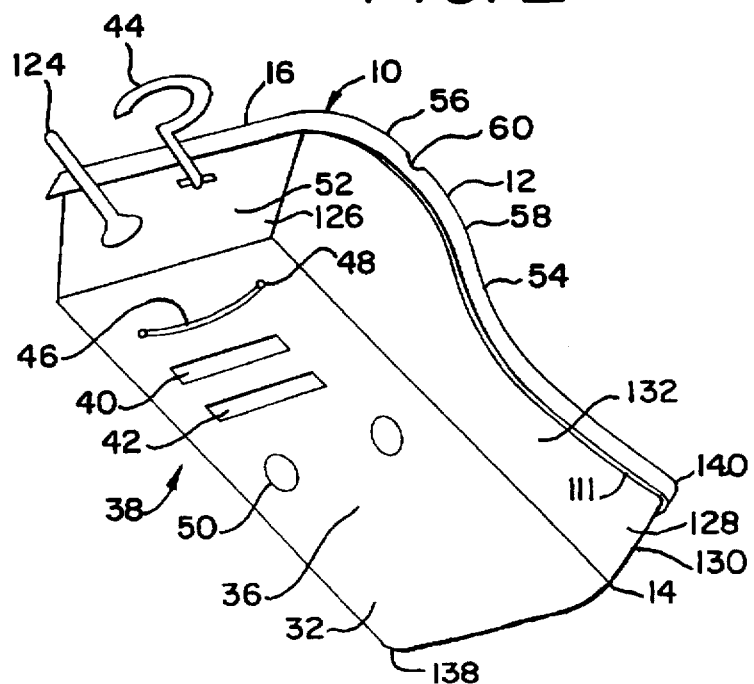

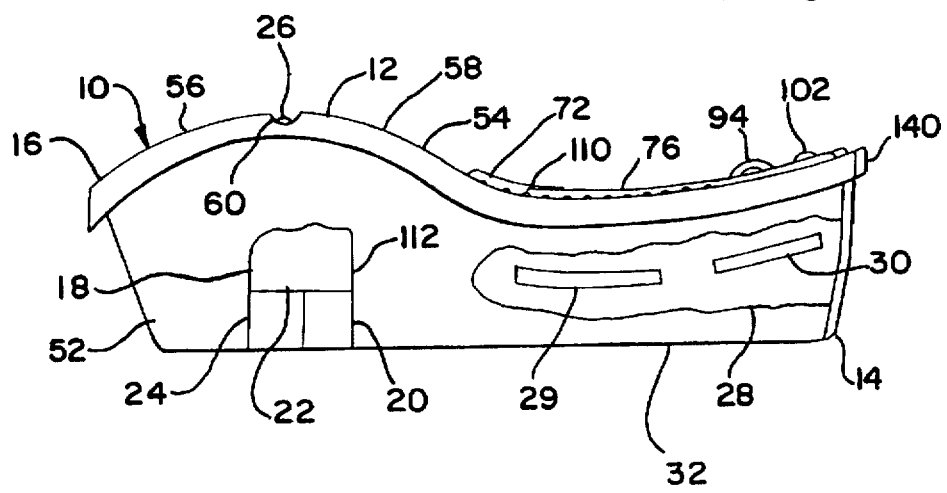
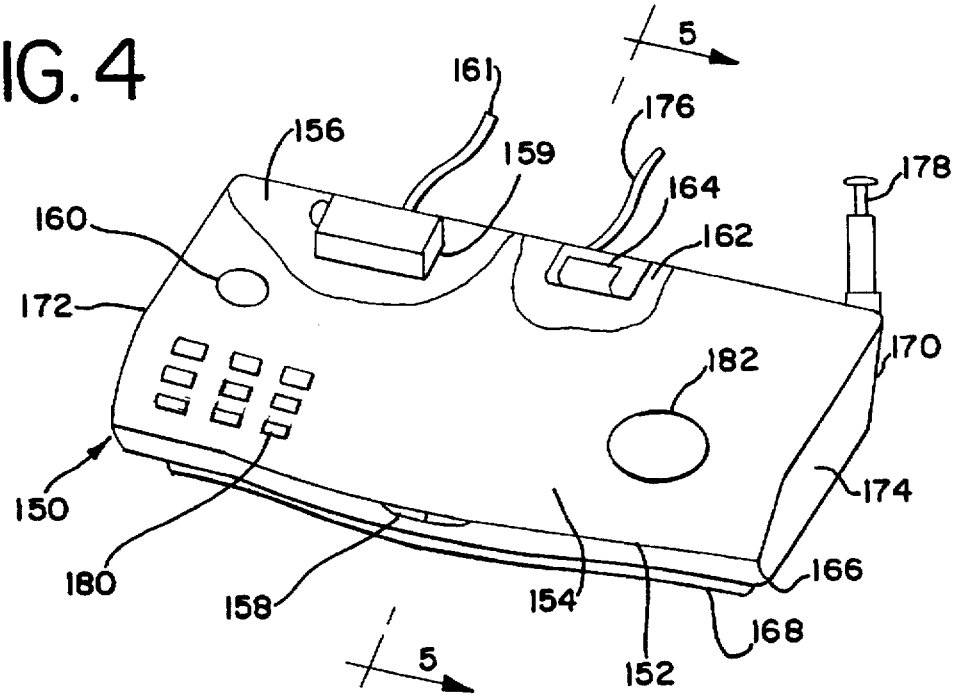
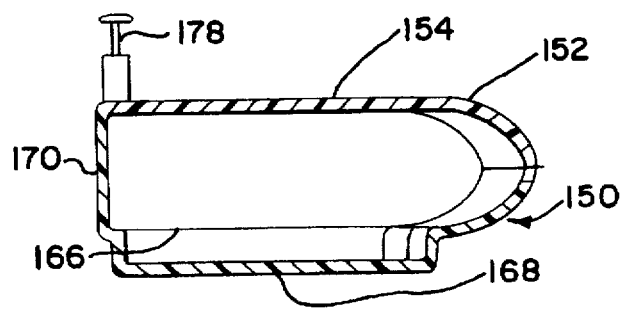

SHOWER SPEAKER TELEPHONE

RELATED APPLICATION

This application is a continuation-in-part of the application of Joseph E. Ford, Donald N. Jursich and Raymond Chan for a Shower Telephone, Ser. No. 08/490,786, filed on Jun. 15, 1995, now U.S. Pat. No. 5,625,688; the application of Joseph E. Ford, Donald No. Jursich and Raymond Chan for a Cordless Shower Telephone Handset, Ser. No. 29/040,337, filed on Jun. 15, 1995, now U.S. Pat. No. D369,357; and the application of Joseph E. Ford, Donald N. Jursich and Raymond Chan for a Shower Telephone Base Unit, Ser. No. 29/040,339, filed on Jun. 15, 1995, now U.S. Pat. No. D372,474.

BACKGROUND OF THE INVENTION

This invention pertains to telephones and, more particularly, to portable telephones for use in showers.

Cordless telephones utilize radio transmission between a portable cordless handset and a base unit which is connected (hard wired) to a telephone line to provide direct-dial telephone service to phones to others in homes, offices, vehicles and other locations. Conventional base units provide a stand and cradle to store and charge the handset when the handset is not in use. Some base units hold the handset in a vertical position. Other base units hold the handset face down in a horizontal position. The purpose of the base unit is to transmit the telephone calls over the telephone line and to cradle and charge the handset when the handset is not being used. Some base units have a light to indicate when it is charging the batteries in the handset.

A conventional cordless handset has alpha numeric pushbuttons for dialing a telephone number in a manner similar to a stationary telephone. The handset may also have a flash button or base-to-handset paging button to indicate an incoming telephone call. The incoming telephone call is received and heard by the user when the flash, paging or receive button on the handset is depressed. Some handsets are automatically connected to the base without depressing a flash, paging or receive button. Typically, there are no alpha numeric push-buttons on the base unit since dialing is done from the handset.

Both the cordless handset and its base unit have an antenna. Since there are no telephone lines which connect the cordless handset to its base unit, both speech and signaling are transmitted by radio waves between the antenna of the handset and the antenna of the base unit. The cordless telephone transmits at a low power. The base unit transmits at a higher power.

Radio transmission can be accomplished between the cordless telephone and the base unit through the use of special tones rather than applying a voltage level or detecting a current as is done in overhead telephone lines. The tones will ring the cordless telephone to indicate an incoming call or will indicate a busy signal. The user of a cordless handset hears a normal dial tone when beginning to make an outgoing call and can continue dialing, i.e. pressing the alpha/numeric buttons, in the same manner as a stationary telephone with overhead telephone lines.

The cordless telephone handset can tune to frequency modulated (FM) channels assigned to the cordless telephones, such as in the 800–900 MHz range. Some cordless telephones can operate from 25–150 feet away from their base units. Other cordless telephones can operate as much as 300–600 feet away from their base unit.

Cordless telephone handsets can operate on a single channel or multiple channels, e.g. 7–100 channels. Each cordless telephone handset can have a small integrated circuit or chip providing a numeric assignment module (NAM). The NAM chip is programmed usually by the telephone dealer or installer to contain the information that uniquely identifies the cordless telephone with its base unit. The information programmed in the NAM chip includes the telephone number and serial number of the cordless telephone.

An antenna is a length of wire that radiates or captures radio signals. Without an antenna, the cordless handset would be virtually useless since the telephone would have no means to transmit and receive signals to and from its base unit. Because of the microwave frequencies utilized in cellular telephones, it is possible to make the cordless telephone antennas quite small. Cordless telephone antennas come in many shapes and sizes. Generally the antenna radiates an omnidirectional signal, i.e. one that radiates outwardly in all directions from the antenna.

Conventional cordless telephones must be used in dry places inside a house, office, etc. They can also be used outside on a sunny or dry day, provided they are within close range of its base unit. Rain, moisture or water will short out cordless telephones and may present an electrical hazard and serious danger to the user that may cause electrical shock or even electrocution to the user. Manufacturers, suppliers and distributors of cordless telephone usually warn their customers in an accompanying instruction booklet not to submerge the cordless telephone or use the cordless telephone in showers, bathtubs, rain, or excess moisture or humidity.

Many people receive telephone calls when taking showers or in a bathtub. This is very inconvenient, since the person in the shower or bath to receive the telephone call has to get out of the shower or bath, put a towel or robe over their dripping wet body and run to the telephone. Sometimes they get to the telephone after it stops ringing which is too late to receive the call. Other times the person in the shower or bath do not hear the telephone call. This can be very frustrating.

It is, therefore, desirable to develop an improved cordless telephone system for use in showers, which overcomes most, if not all, of the preceding problems.

SUMMARY OF THE INVENTION

An improved portable cordless telephone with a speakphone is provided for hands-free use in showers and baths. The safe, user-friendly cordless telephone can be readily attached and removed from convenient portions of the shower/bath unit, such as: a shower wall, shower door, sliding shower panel, towel rack, bracket, holder, or shower head pipe. Advantageously, the novel cordless telephone system is attractive, convenient, economical, reliable and effective.

The speakerphone can comprise an amplified speaker for receiving telephone signals and for amplifying the an incoming caller's voice to a sufficient audible level to be heard by the user in a shower at a distance spaced from the speaker, and an amplified microphone for detecting and receiving the user's voice in the shower at a distance spaced from the microphone and for transmitting telephone signals. The shower speaker telephone preferably comprises a special portable cordless handset with a water-impervious (water-resistant/waterproof) housing into which the speakerphone is mounted. The housing can have a hollow interior cavity or compartment to house electrical receiving and transmitting circuitry which is connected to the speaker and microphone, respectively, to facilitate receiving and transmission of telephone calls.

Significantly, the housing comprises a water-impervious barrier for preventing water from entering into the interior cavity or compartment of the housing and shorting/shunting the telephone circuitry. Desirably, the handset body is made of an impact-resistant electrically insulating material capable of withstanding water pressure from a shower and is grounded, insulated, and electrically non-conductive to prevent electrical shock and electrocution. A water-impervious antenna can extend upwardly from the telephone housing.

In the preferred form, the telephone housing has a battery chamber to receive a battery pack comprising at least one battery, and typically, a set of batteries, to power the telephone. A water impermeable seal is positioned about the battery chamber to prevent water from entering into the battery chamber and shorting the batteries in the battery pack. Preferably, the handset has an indicator light, such as an light emitting diode (LED), to signal when the power from the battery pack is low.

Fluid sealing means, such as a water impermeable gasket or seal, is mounted between and seals the front and back sections of the telephone housing to prevent water from entering into the interior of the telephone housing and shorting the telephone circuitry. In the preferred form, the fluid seal means comprises an annular elastomeric rib which peripherally surrounds the handset body. Preferably, the earpiece and mouthpiece also have water impermeable membranes to prevent water from passing through the earpiece and mouthpiece into the interior of the handset and shorting the telephone circuitry.

In one form, the cordless shower telephone is only for receiving incoming calls which is activated by an on-off receive button. The cordless shower telephone can have an emergency button, e.g. a 911 button, to signal and transmit a message to an emergency operator if the user falls and hurts themself during a shower or if the user otherwise becomes seriously ill or partially incapacitated. The shower telephone can operate on a single channel or multiple channels. The deluxe shower telephone, can have: an alpha numeric keypad with pushbuttons for dialing outgoing telephone calls, a redial button, a hold button, a flash button, a conference call button, as well as a window or display for displaying the telephone number of an outgoing telephone call and/or identification (ID) of an incoming call. The deluxe shower telephone can also include: an AM and/or FM radio, intercom, and clock, as well as control therefor.

The base unit or base of the shower telephone system is located away from the shower and bathtub, either in the bathroom or another room. The base unit has a battery charging chamber for recharging batteries or charging an extra pack of batteries for use in the cordless telephone. The base unit can also have a battery charging indicator light or LED to indicate when the batteries are charging or have become fully charged. The base unit also has a base antenna which communicates with the antenna of the cordless telephone. The antennae can be foldable or retractable for ease of shipment and storage.

The base unit can have an interior compartment or chamber which houses telephone circuitry for transmitting and receiving telephone calls. The base unit can also have a separate set of alpha numeric keys to dial or transmit outgoing telephone calls from the base unit. The base unit can have an adapter plug and telephone cord which is hardwired and connected to the telephone line in the user's home, office, etc. The base unit can also have a power cord which is connected to the electrical lines in the user's home, office, etc. to power the battery charger in the base unit, LED display, etc.

The base unit can provide a cradle to store the cordless shower telephone, but need not do so since the cordless shower telephone can be powered by a separate battery pack.

A more detailed explanation of the invention is provided in the following description and claims.

BRIEF DESCRIPTION OF THE DRAWINGS

FIG. 1 is a front perspective view of a shower speaker telephone in accordance with principles of the present invention;

FIG. 2 is a back perspective view of the shower speaker telephone;

FIG. 3 is a side view of the shower speaker telephone with portions broken away for ease of understanding and clarity;

FIG. 4 is a front perspective view of the base unit with portions broken away for ease of understanding and clarity; and FIG. 5 is a cross sectional view of the base unit taken along line 5–5 of FIG. 4.

DETAILED DESCRIPTION OF THE PREFERRED EMBODIMENTS

A shower speaker telephone system 10 comprises a portable cordless shower speaker telephone 12 providing a light weight waterproof handset 14 which can be safely, conveniently and comfortable used in a shower. While the water-resistant handset is particularly useful in a shower, it can also be safely used when taking a bath. The cordless telephone handset can comprise an analog handset, a digital handset, or a dual mode handset that has both an analog capacity and a digital capacity The shower speaker telephone 12 comprises an impact-resistant plastic telephone housing 16 or shell which provides a semi-rigid handset body that can withstand water pressures from a shower ranging from 20–80 psi. The telephone housing 16 has an internal battery chamber or compartment 18 (FIG. 3) with a removable battery-access door 20 to receive a battery pack 22 comprising a set of batteries 24 to power the cordless speaker telephone. The telephone housing also has a low battery LED indicator 26. The housing further has an interior telephone and radio circuitry-containing chamber, cavity or compartment 28 which houses and contains telephone and intercom circuitry including a transmitting circuitry and receiving circuitry to power the portable cordless shower telephone. Chamber 28 can also include radio circuitry 29. The telephone and radio circuitry can be mounted on circuit boards or comprise microchips. The battery chamber can be spaced apart from the telephone circuitry-containing chamber.

The telephone housing can comprise two or more separable parts separated by a parting line for access into the interior of the handset. The telephone housing can include a back section 32 providing a back and a front section 34 providing a front. The back 32 of the telephone housing has a generally planar or flat surface 36 so that the back of the shower telephone it can be mounted flush against the bathroom wall, shower door or sliding shower panel.

The back 32 (FIG. 2) of the housing can have a connector 38 to hook, removably attach, securely fasten, or detachably connect the shower speaker telephone to convenient portions of the shower/bath unit, such as: a shower wall, bathroom wall, shower door, sliding shower panel, towel rack, bracket, holder, or shower head pipe. The connector can be: Velcro-type fasteners 40; two-way sticky tape 42; a stationary, moveable or pivotable hook 44; a picture frame-like wire 46 comprising stainless steel wire, aluminum wire, a flexible plastic line, plastic impreganated rope, or rubber bands, held by threaded hooks; screws, hollow bolt fasteners or other other fasteners 48, or elastomeric suction cups 50. The hook can also be attached to the top 52 of the housing.

The front of the telephone housing can have a wave-shaped portion 54 providing a wavy S-shaped section or sinusoidal section with a rounded convex top area 56 and a curved concave intermediate area 58 to enhance accoustical transmission and reception of voice and radio waves. The apex of the rounded top 56 can provide an undercut rounded groove, ridge or channel 60 with apertures and a low-battery indicator 26 (FIG. 1). The top or intermediate area of the wave-shaped portion can have a rectangular telephone-display window 64 to indicate and display the telephone number being called/dialed or the caller identification (ID) of an incoming call. The window can comprise a liquid crystal display (LCD) or light emitting diodes (LED). The window can also include a digital clock 66 or an analog clock. The window or another window 68 can also display a radio station or channel for a shower speaker telephone equipped with a radio 70, such as a AM radio, FM radio or AM/FM radio.

The telephone housing has a speakerphone 72 comprising an amplified speaker 74 and an amplified microphone 76. The intermediate and left lower portion of the front of the housing has speakerphone holes or apertures 78 commmunicating with the speakerphone. The amplified speaker receives telephone signals and amplifies an incoming caller's voice to a sufficient audible level to be heard by the user in a shower at a distance spaced away from the speaker. The speaker receives the senders's (caller's) voice from a receiving diaphragm or other vibrating means which converts current and voltage in audible tones. The receiving diaphragm can cover the speaker and can be positioned between the speaker the the speakerphone apertures. The amplified microphone detects and receives the user's voice in the shower at a distance spaced away from the microphone and transmitting outgoing telephone signals. The microphone transmits the user's voice to a transmitting diaphragm or other vibrating means which convert acoustical vibrations (words) into electrical impulses, i.e. voltage and current. The transmitting diaphragm can cover the microphone and can be positioned between the microphone and the speakerphone apertures. The receiving and transmitting diaphragms preferably comprise a water-impervious flexible membrane which prevents water from entering the speakerphone and shorting the internal telephone circuitry. The speaker and receiving diaphragm are connected to the receiving-circuit within the interior of the telephone housing to receive telephone signals from other telephones via the base unit and to unscramble and convert telephone signals into recognizable audible tones for the listener's ear. The microphone and transmitting diaphragm can be connected to a transmitting-circuit within the interior of the telephone housing to transmit telephone signals and to scramble and convert the user's voice/talking into telephone signals for transmission to the receiving telephone via the base unit.

The front of the telephone housing can have: a receive on-off button 80 (on-off switch), a speakerphone talk-activation button or bar 82, and a 911 emergency button 84. The emergency button when depressed or activated will transmit and connect with an emergency operator in case the user falls and hurts themself in a shower or is otherwise in need or emergency assistance. This is particularly useful for elderly persons.

The illustrative shower telephone can be operable on one channel but can also be used on multichannels. While the illustrative telephone housing can be operated to receive only incoming calls, it can be also be equipped with finger-engageable, depressible, resilient keys 86 providing a telephone housing-key pad positioned in the intermediate and/or lower portion of the front of the telephone housing. The keys can be elliptical, rounded, circular, or rectangular. The keys can include: alpha numeric buttons 88, a volume control button 90, a clear/stop/end button 91, a redial button 92, a hold button 93, a conference call button, and/or automatic dialing buttons for user-programmed stored telephone numbers. The keys can also include radio controls 94 or knobs, such as: an AM selection button 96, an FM selection button 98, a scan button 100, preset channel-selecting buttons 102, bass control button, treble control button, etc. The keys can further include clock adjustment controls or knobs, such as an hour adjustment button 104 and a minute adjustment button 106. The keys can also include an intercom button 108 when the speaker is connected to an intercom 110.

An annular peripheral elastomeric rib providing a gasket 111 (FIG. 2) is positioned snugly between the front and back sections of the telephone housing. The elastomeric rib peripherally and longitudinally surrounds the handset. The rib comprises an elastomer which is impervious to water, liquid, and solids to prevent water, soap, shampoo, hair conditioners and dirt from entering into the interior of the handset and shorting the handset telephone and radio circuitry. The rib can be positioned in proximity to or include an elastomeric battery pack-seal 112 (FIG. 3) positioned about the handset-battery chamber compartment 18 and a battery-access door 20. The telephone housing's battery-seal comprises an elastomer which is impervious to water, liquid, and solids to prevent water, soap, shampoo, hair conditioners and dirt from entering into the interior of the battery chamber and shorting the batteries in the telephone housing. The elastomeric rib and seal cooperates with the telephone housing to provide a protective shower-impervious assembly.

A handset telephone antenna 124 (FIGS. 1 and 2) can extend upwardly and outwardly from the top of the telephone housing and is connected to the telephone circuitry in the cordless shower telephone. The telephone antenna is tuned to receive and transmit telephone signals. More specifically, the handset antenna of the cordless telephone receives telephone signals from the antenna of the base unit along frequency modulated (FM) channels. The handset antenna can also transmits telephone signals along a frequency modulated band to the antenna of the base unit. The telephone antenna can be made of copper or other conductive metal. The handset antenna can comprise an: omnidirectional antenna, a telescoping antenna, a retractable antenna, a collapsible antenna, a foldable antenna, a pivotable antenna, or a flexible antenna, such as a flexible rubber antenna. Preferably, the antenna, is coated or encapsulated with a water-impermeable elastomer so as to have an exterior water-impervious surface. The handset antenna can also comprise an AM and/or FM radio antenna. In some circumstances, it may be desirable that a separate AM and/or FM radio antenna extend upwardly from the top of the telephone housing in addition to the telephone antenna.

The elastomeric rib, seal, and coating for the handset antenna, can be made of rubber or rubber-like plastic, such as: neoprene, silicone, polyurethane, polychlorprene, nitrile rubber, butyl rubber, polysufide, cis-i, 4-polyisoprene, ethylene-propylene terpolymers (EPDM rubber).

Preferably, the speaker membrane and microphone membrane are made of polyester film, such as manufactured by E. I. DuPont de Nemours & Co. and sold under the trade name Mylar. In some circumstances, it may be desirable to use other materials for the speaker membrane and micorphone membrane, such as: polyvinyl acetate, polyvinyl alcohol, polyvinyl buryral, polyvinyl chloride, cellulose acetate, cellulose acetate butryare, cellulose propionate, nylon, cellulose nitrate, ethyl cellulose, cellophane, fluorethenes, polyethylene, polyester, polystyrene, vinyl acetate, vinylidene chloride, polyamides, or methyl methacrylate.

As shown in FIGS. 1–3, the telephone housing has end walls 126 and side walls 128. The end walls include a top wall 52 providing a top, a bottom wall providing a bottom 130, a left side wall 132 and right side wall 134. The intersection of the bottom wall and side walls can provide rounded corners 138. The edges 140 of the front section overlap and extend over the end walls and side walls.

The telephone housing comprises a plastic which is impervious to water, liquid, and solids to prevent water, soap, shampoo, hair conditioners and dirt from entering into the interior of the telephone housing and shorting the shower telephone's circuitry and batteries. In the preferred embodiment, the telephone housing comprising the is made of acrylonitrile butadiene styrene (ABS). In come circumstances, it may be desirable that the telephone housing be made of other materials, such as: polyvinyl chloride (PVC), polyurethane, polyethylene, polyethylene oxide, polycarbonate, polyethylene, polypropylene, olefins (polyolefins), polyamides, nylon, polyamide-imides, polyimide sulfones, styrenes including styrene/acrylonitrile (SAN), styrene/butadiene (SB), styrene/maleic anyhydryde, vinyls including polyvinyl acetal, polyvinyl acetate (PVAC), polyvinyl alcohol (PVAL), polyvinyl butyryl (PVB), polyvinyl carbazole (PVK), polyvinylpyrrolidone (PVP), polyvinyl chloride acetate (PVCA), polyvinyl fluoride (PVF), polyvinylidene chloride PVDC), polyoxymethylene, ethylene/ethyl acrylate (EEA), acrylonitrile/styrene/acrylate (ASA), acetal (polyformaldehyde), acetate, ethylene/vinyl acetate (EVA), butyrate, acrylic (polymethyl methacrylate), acrylonitrile/methyl/methacrylate (AMMA), cellulosics including cellulose nitrate (CN), cellulose propionate (CP), ethyl cellulose (EC), cellulose acetate (CA), cellulose acetate butyrate (CAB), cellulose acetate propionate (CAP), cellulose formaldehyde (CF), cellulose triacetate (CTA), polyethylene terephthalate (PET), fluropolymers including chlorinated polyethylene (CPE), chlorinated polyvinyl chloride (CPVC), ionomers, polyarylate, polyarylterephthalate (PAT), polyarylether (PAE), polyarylamid (polyaramide), polyarylsulfone, polyphthalamide, polyarylsulfone, polybutylene, polyester, ethylene, polyuryletherketone, polymethylpentane, polyphenylene sulfide, polyphtralamide, or polysulfone, or combinations or blends of two or more of the preceding. The handset housing can also be coated or made with polytetrafluoroethylene (PTFE) or other hydrophobic water-impermeable, liquid-impervious materials.

The shower telephone system has a base unit 150 (FIGS. 4 and 5) providing a base. The shower telephone base unit 150 has a base housing 152 with pivotable lid, door or top 154 for access into an interior battery-charging chamber or compartment 156. The lid can have a finger-gripable lip 158, handle, or latch to facilitate opening of the lid. The battery-charging chamber contains a battery charger 159 to recharge batteries from the battery pack in the handset or to charge an extra set of batteries for the cordless handset. The battery charger is connected to a power cord 161 with an outlet plug that plugs into the electrical socket of the user's house, office, etc. The base housing also has a battery charging LED indicator 160. The base housing can be made of the same plastic as the handset housing.

The base unit's housing also has an interior telephone circuitry-containing chamber or compartment 162 which houses and contains telephone circuitry 164 including a transmitting circuitry and receiving circuitry. The base unit's telephone circuitry can be mounted on a circuit board or comprise a microchip. The telephone circuitry-containing chamber can be spaced apart from the battery charging chamber. The bottom 166 of the housing of the base unit can be supported by a pedestal or stand 168. The back 170 or side 172 or 174 of the base housing can have a cord-receiving opening which provides a port or socket to receive a plug, adapter, and/or connector, attached to a telephone cord 176. The other end of the telephone cord has a base-engaging plug, adapter, and/or connector which matingly engages and fits into a port or socket of a telephone-line socket or jack to hardwire and connect the base unit to the telephone line of the user's home, office, etc. The base unit transmits and receives telephone signals to and from other telephones via the telephone line.

A base antenna 178 can extend upwardly from the top, back or sides of the base housing. The base antenna is tuned to receive and transmit telephone signals from the base unit to the cordless shower telephone. More specifically, the base antenna transmit telephone signals it receives from other telephones to the handset antenna of the cordless shower speaker telephone along frequency modulated (FM) channels. The base antenna receives telephone signals along a frequency modulated band from the handset antenna of the cordless handset for transmission through the telephone line. The base antenna can be made of copper or other conductive metal. The base antenna can comprise an: omnidirectional antenna, a foldable antenna, a telescoping antenna, a retractable antenna, a collapsible antenna, a pivotable antenna, or a flexible antenna.

The telephone circuitry of the base unit provides a transceiver which comprises a control and logic unit. The transceiver can contain an amplifier, demodulator, and circuitry for tuning to telephone signals received by said base unit's telephone antenna, as well as carrier oscillators, amplifiers, and circuitry to transmit telephone signals through the base antenna to the cordless shower speaker telephone and through the telephone line to other telephones.

In some circumstances, it may be desirable that the base unit be equipped with finger-engageable, depressible, resilient base keys 180 providing a base key pad. The keys can be rectangular or circular. The keys can include: alpha numeric buttons, a clear/stop/end button, a redial button, a hold button, and/or automatic dialing buttons for user-programmed stored telephone numbers. The base unit can also have a speaker 182 mounted along the base housing for hands-free telephone discussions from the base unit.

In some circumstance, it may be desirable that the base unit comprise a cradle that is shaped complementary to the mouthpiece, bottom portion or front of the shower speaker telephone. The cradle can cradle, receive and support the shower speaker telephone vertically or horizontally when the shower speaker telephone is not in the shower stall or bath area.

Among the many advantages of the shower speaker telephone system are: (1) outstanding performance in showers and baths; (2) superb quality; (3) safe; (4) easy to use; (5) convenient; (6) comfortable; (7) attractive; (8) economical; (9) dependable; (10) efficient; and (11) effective.

Although embodiments of the invention have been shown and described, it is to be understood that various modifications and substitutions, as well as rearrangements of parts and components can be made by those skilled in the art without departing from the novel spirit and scope of this invention.

What is claimed is:

1. A telephone system, comprising:
   a shower speaker telephone for use in a shower, said telephone comprising
   a water-impervious housing with a front section and a back section;
   said front section including a speakerphone comprising an amplified speaker for receiving telephone signals and for amplifying an incoming caller's voice to a sufficient audible level to be heard by an user in the shower at a distance spaced from the speaker, and an amplified microphone for detecting and receiving the user's voice in the shower at a distance spaced from the microphone and from transmitting telephone signals;
   said housing comprising an impact-resistant electrically insulating material capable of withstanding water pressure from the shower;
   said housing defining a hollow interior compartment for housing receiving circuitry connected to said microphone and transmitting circuitry connected to said speaker;
   said housing comprising a shower-impervious assembly providing a water-impervious barrier for preventing water from entering into said compartment and shorting said receiving and transmitting circuitry; and
   said shower-impervious assembly including a shampoo-resistant rib and a soap-resistant seal.

2. A telephone system in accordance with claim 1 wherein:
   said telephone comprises a portable cordless telephone for resisting water pressures ranging from about 20 pounds per square inch (psi) to about 80 pounds per square inch (psi);
   said portable cordless telephone having a water-impervious antenna; and
   said housing having a battery chamber for receiving at least one battery for powering said telephone; and an indicator light for signaling when the power in the battery is low.

3. A telephone system in accordance with claim 1 wherein said telephone includes a display with a clock.

4. A telephone system in accordance with claim 1 wherein said housing has a radio selected from the group consisting of an AM radio, an FM radio, and an AM/FM radio, controls for selecting channels on said radio, and said speaker for broadcasting a radio station to a listener in the shower.

5. A telephone system in accordance with claim 1 wherein said telephone has an emergency button for transmitting a call to an emergency operator.

6. A telephone system in accordance with claim 1 wherein:
   said housing includes in intercom; and
   said front section has a keypad comprising a set of alpha numeric buttons for transmitting telephone numbers.

7. A telephone system in accordance with claim 2 including a base located away from the shower, said base having a battery charging chamber for charging batteries for use in said portable telephone, a base antenna from communicating with the portable telephone antenna, a telephone cord for connection to a phone line, and an interior chamber for containing telephone transmitting and receiving circuitry; and said base has a set of keys comprising alpha numeric pushbuttons for dialing telephone numbers.

8. A shower telephone system, comprising:
   a shower speaker telephone comprising a portable cordless telephone for use in a shower, comprising
   an impact-resistant soap-impervious plastic housing providing a semi-rigid handset body for resisting water pressures from a shower ranging from about 20 pounds per square inch (psi) to about 80 pounds per square inch psi), and housing defining an internal battery chamber for receiving a battery pack comprising a set of batteries to power the handset, said housing defining an interior telephone circuitry-containing chamber for containing telephone circuitry including transmitting circuitry and receiving circuitry, and said housing having a front section and a back section;
   an annular peripheral elastomeric shampoo-impervious rib providing a gasket positioned snugly between the front and back sections of the handset, said elastomeric gasket peripherally and longitudinally surrounding the handset, said gasket comprising an elastomer, said elastomer being impervious to water, liquid, and solids to prevent water, soap, shampoo, hair conditioner and dirt from entering into the telephone circuitry-containing chamber of the handset and shorting the telephone circuitry;
   an elastomeric battery pack-seal comprising a hair conditioner-impervious elastomer positioned about the battery chamber, said battery pack-seal being impervious to water, liquid, and solids for preventing water, soap, shampoo, hair conditioner and dirt from entering into the battery chamber and shorting the battery pack;
   said housing having an activating switch comprising an on-off button connected to said telephone circuitry and having a battery indicating light comprising a light emitting diode, and said soap-impervious housing being impervious to water, liquid, and solids to prevent water, soap, shampoo, hair conditioner and dirt from entering into the telephone circuitry-containing chamber and battery chamber of the telephone and shorting the telephone circuitry and battery pack;
   said front section of the telephone comprising a speakerphone with a telephone speaker communicating with said receiving circuitry for broadcasting an incoming caller's voice to a sufficient audible level to an heard by an user in the shower at a distance spaced from the speaker, a mouthpiece comprising a microphone communicating with said transmitting circuitry for receiving the user's voice in the shower at a distance spaced from the microphone and for transmitting telephone signals; and
   a handset antenna extending outwardly from said housing and connected to said telephone circuitry, said antenna having an exterior water-impervious surface.

9. A shower telephone system in accordance with claim 8 wherein:
   said front section including a wave-shaped portion with a convex area and a concave area for enhancing accoustical transmission and reception of voice and radio waves;
   said housing comprises a plastic selected from the group consisting of acrylonitrile butadiene styrene (ABS), polyvinyl chloride (PVC), polyurethane, polyethylene, polyethylene oxide, polycarbonate, polyethylene, polypropylene, olefins, polyolefins, polyamides, nylon, polyamide-imides, polyimide sulfones, styrenes including styrene/acrylonitrile (SAN), styrene/butadiene (SB), styrene/maleic anyhydryde, vinyls including polyvinyl acetal, polyvinyl acetate (PVAC), polyvinyl alcohol (PVAL), polyvinyl butyryl (PVB), polyvinyl carbazole (PVK), polyvinylpyrrolidone (PVP), polyvinyl chloride acetate (PVCA), polyvinyl fluoride (PVF), polyvinylidene chloride PVDC), polyoxymethylene, ethylene/ethyl acrylate (EEA), acrylonitrile/styrene/acrylate (ASA), acetal, polyformaldehyde, acetate, ethylene/vinyl acetate (EVA), butyrate, acrylic, polymethyl methacrylate, acrylonitrile/methyl/methacrylate (AMMA), cellulosics, cellulose nitrate (CN), cellulose propionate (CP), ethyl cellulose (EC), cellulose acetate (CA), cellulose acetate butyrate (CAB), cellulose acetate propionate (CAP), cellulose formaldehyde (CF), cellulose triacetate (CTA), polyethylene terephthalate (PET), fluropolymers, chlorinated polyethylene (CPE), chlorinated polyvinyl chloride (CPVC), ionomers, polyarylate, polyarylterephthalate (PAT), polyarylether (PAE), polyarylamid, polyaramide, polyarylsulfone, polyphthalamide, polyarylsulfone, polybutylene, polyester, ethylene, polyuryletherketone, polymethylpentane, polyphenylene sulfide, polyphtralamide, polysulfone, and combinations thereof;

said elastomer in said gasket is selected from the group consisting of neoprene, silicone, polyurethane, polychlorprene, nitrile rubber, butyl rubber, polysufide, cis-i, 4-polyisoprene, ethylene-propylene terpolymers, and natural rubber;

said battery-pack seal comprising an elastomeric seal selected from the group consisting of neoprene, silicone, polyurethane, polychlorprene, nitrile rubber, butyl rubber, polysufide, cis-i, 4-polyisoprene, ethylene-propylene terpolymers, and natural rubber;

said exterior water-impervious surface of said handset antenna comprises a material selected from the group consisting of neoprene, silicone, polyurethane, polychlorprene, nitrile rubber, butyl rubber, polysufide, cis-i, 4-polyisoprene, ethylene-propylene terpolymers, and natural rubber; and said handset antenna is selected from the group consisting of an omnidirectional antenna, a foldable antenna, a telescoping antenna, a retractable antenna, a collapsible antenna, a pivotable antenna, and a flexible antenna.

10. A shower telephone system in accordance with claim 8 including a base unit comprising:

a base housing defining a battery-charging chamber for containing a battery charger to recharge batteries from the battery pack in the cordless telephone or to charge an extra set of batteries for the cordless telephone;

a power cord for connecting said battery charger to an electrical outlet;

said base housing having a battery charging indicator;

said base housing defining an interior base telephone circuitry-containing chamber for containing telephone circuitry including a transmitting circuitry and receiving circuitry, said telephone circuitry-containing chamber being spaced from said battery-charging chamber;

a telephone cord for connecting said telephone circuitry in said base unit to a telephone line; and a base antenna extending upwardly from said base housing and operatively connected to said telephone circuitry in said base housing, said base antenna being selected from the group consisting of an omnidirectional antenna, a foldable antenna, a telescoping antenna, a retractable antenna, a collapsible antenna, a pivotable antenna, and a flexible antenna.

11. A shower telephone system in accordance with claim 8 wherein:

said front section of said telephone includes keys comprising alpha numeric push buttons for initiating an outgoing telephone call and an emergency button for signaling an emergency operator; and said back section of said portable cordless telephone has a connector for removably attachment to a shower wall, shower panel, shower door, towel rack, bracket, or shower head pipe of a shower stall.

12. A telephone system in accordance with claim 8 wherein: said housing has a radio selected from the group consisting of an AM radio, an FM radio, and AM/FM radio; controls for selecting channels on said radio; the speaker for broadcasting a radio station to a listener in the shower; a radio station indicator for indicating the selected channel; a display window for displaying the telephone number of an outgoing call; and a clock for displaying the time.

* * * * *